E. V. HARTFORD AND L. MASTRANGEL.
SYSTEM FOR GENERATING, STORING, DISTRIBUTING, AND UTILIZING ELECTRICAL ENERGY.
APPLICATION FILED JUNE 19, 1912.

1,364,852.

Patented Jan. 4, 1921.
3 SHEETS—SHEET 1.

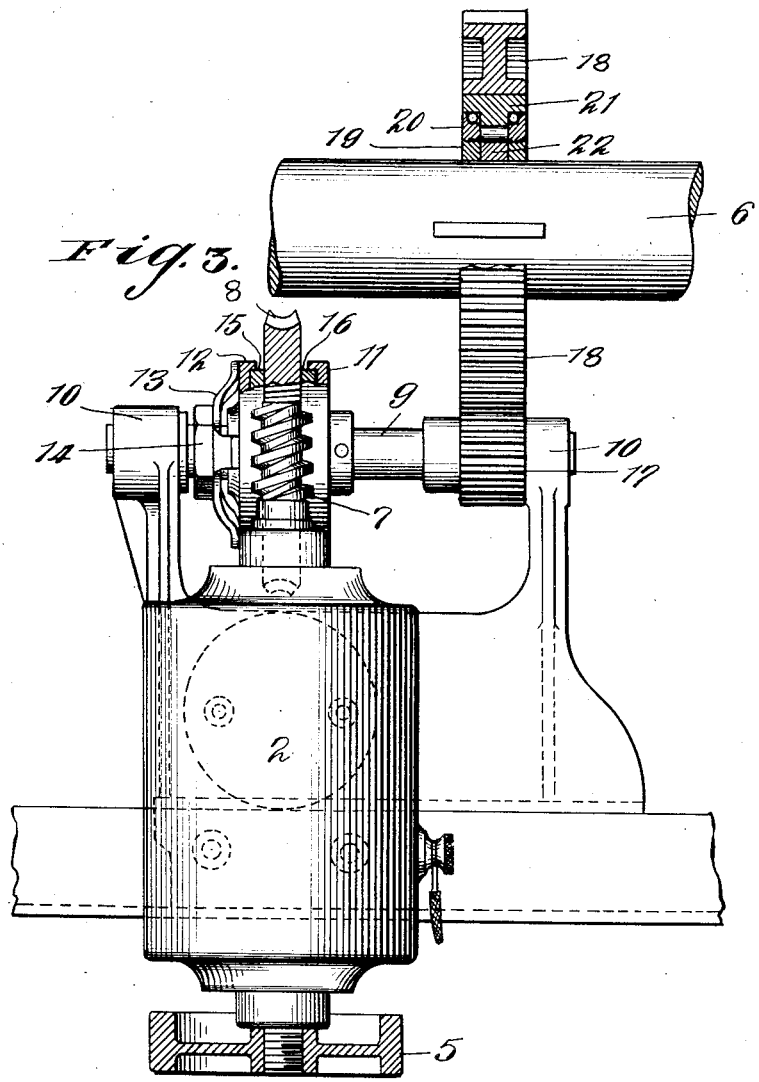

UNITED STATES PATENT OFFICE.

EDWARD VASSALLO HARTFORD, OF DEAL, AND LOUIS MASTRANGEL, OF HOBOKEN, NEW JERSEY; SAID MASTRANGEL ASSIGNOR TO SAID HARTFORD.

SYSTEMS FOR GENERATING, STORING, DISTRIBUTING, AND UTILIZING ELECTRICAL ENERGY.

1,364,852.     Specification of Letters Patent.     Patented Jan. 4, 1921.

Application filed June 19, 1912. Serial No. 704,489.

*To all whom it may concern:*

Be it known that we, EDWARD V. HARTFORD and LOUIS MASTRANGEL, citizens of the United States, residing at Deal, in the county of Monmouth and State of New Jersey, and at Hoboken, in the county of Hudson and State of New Jersey, respectively, have invented certain new and useful Improvements in Systems for Generating, Storing, Distributing, and Utilizing Electrical Energy, of which the following is a full, clear, and exact specification.

Our invention relates to the generation, storage, distribution, and utilization of electrical energy.

Our invention is particularly applicable to automobiles for the purpose of lighting, ignition, and starting, but while we have illustrated in the accompanying drawings a system embodying our invention designed for accomplishing these purposes, the same is made by way of example only, as indicative of one useful application of the invention, having it understood that we do not limit ourselves in this respect, as the invention, in whole or in part, may be applied differently for other purposes.

More particularly our system, broadly speaking, embraces a generator, a storage-battery, and a motor, designed primarily to work conjointly, but adapted to be used separately, and having associated therewith suitable controlling means to enable the system to effectively accomplish results on a current of low voltage.

In the present described application of the invention the battery capacity is six volts, and the generator is designed to constantly maintain the same charged to its rated capacity. A lighting system with its lamps in multiple is suitably connected to the battery. The motor which is used as a starting motor is so constructed that it will operate on this low voltage and effectively turn over an engine to which it might be connected, and this instantly on a small consumption of the battery energy.

In such a system as we are describing the underlying idea involved in our invention is the practical adaptation of a system of generation, storage, distribution, and utilization of electrical energy for accomplishing an amount of work on a lower voltage and smaller current consumption than has heretofore been possible, and also the accomplishment of the desired result by apparatus which is extremely simple, small in size, of minimum weight, and conveniently located.

While we are describing a system which involves a number of coördinate devices for carrying out several purpose, we would have it distinctly understood that the separable parts of the system may be used alone for their intended purposes as specified or other purposes wherever desired or where they may be found useful.

For the purpose of clear description and full understanding of the system as well as of its independently operative features, we will divide the system into parts and describe them in chapters entitled "Starting," "Generating," "Lighting," and "Ignition."

*Starting.*—The starting part of our system as illustrated comprises a motor of a high-speed type having a high starting torque characteristic which may be operated by a 6-volt battery. The motor is associated with the main shaft of the engine and is connected therewith by means of reduction gears conveniently arranged between the engine and motor.

The armature of the motor carries a small balance-wheel in which, during rotation, is stored up kinetic energy which is utilized to assist and give added momentum to the crank-shaft at the crucial point of compression. The energy stored up in this small balance-wheel alone has been found in practice to be sufficient to turn the engine over several times after the battery circuit has been broken and the current taken off the motor. This is important since it is a well known fact that the initial impulse cannot always be secured in a single attempt to fire a charge in the first cylinder under compression, thus making it necessary to crank until the initial impulse is obtained.

As soon as the engine is started a clutch on the crank-shaft automatically and positively releases, and the gears of the starting device, which are always in mesh, become stationary, leaving the main shaft of the engine to run on its own bearings. Thus it is seen that the explosion will cause the crank-shaft of the engine to move at a speed greatly in excess of that imparted by the motor. This feature is of extreme importance since it prevents injury to, or derangement of, the mechanism.

To care for a possible back-kick of the engine, effective provision is made in the form of a small shock absorber or friction-clutch, the same comprising a worm-gear actuated by the starter and mounted freely and held in position on a counter-shaft by a friction-disk and spider-spring, the latter being adjustably mounted so that sufficient tension can be put thereon to drive the mechanism. This yielding connection permits the shaft to slip around without injuring the gears in the event of a back-kick.

In order to facilitate an initial start of the engine, we provide certain mechanism which partly relieves the compression in the cylinders by coöperating with, and slightly opening, the exhaust valves. This mechanism controls the motor circuit and when running conditions are obtained in the engine, the exhaust valves are automatically closed under the force of the explosions and the motor circuit is automatically broken so that a minimum amount of energy is consumed for starting.

*Generating.*—The generating part of the system, as shown and described, comprises a small dynamo or generator of any desired type which will provide a substantially constant voltage to the storage battery irrespective of the speed at which it is driven. One such generator is that of the permanent magnet type which is provided with an auxiliary field for increasing the voltage; or the generator may be provided with a choking system which will substantially control the voltage; or any convenient form of generator may be used in connection with a governing clutch of magnetic or mechanical form; the ony essential being that the generator shall be adapted to supply a substantially constant voltage under all service conditions. Located in the circuit is an automatic cut-out or magnetic control which disconnects the generator from the battery when the speed of the engine falls to, or below, a predetermined point.

*Ignition.*—The ignition current is supplied by the battery and is led to and through a distributer for the respective cylinders of the engine in the usual manner.

In the drawings accompanying and forming a part of this specification, we have illustrated our invention as applied to an automobile, in which drawings—

Fig. 3 is a top plan view of the same mechanism as is shown in Fig. 2.

Figure 1:
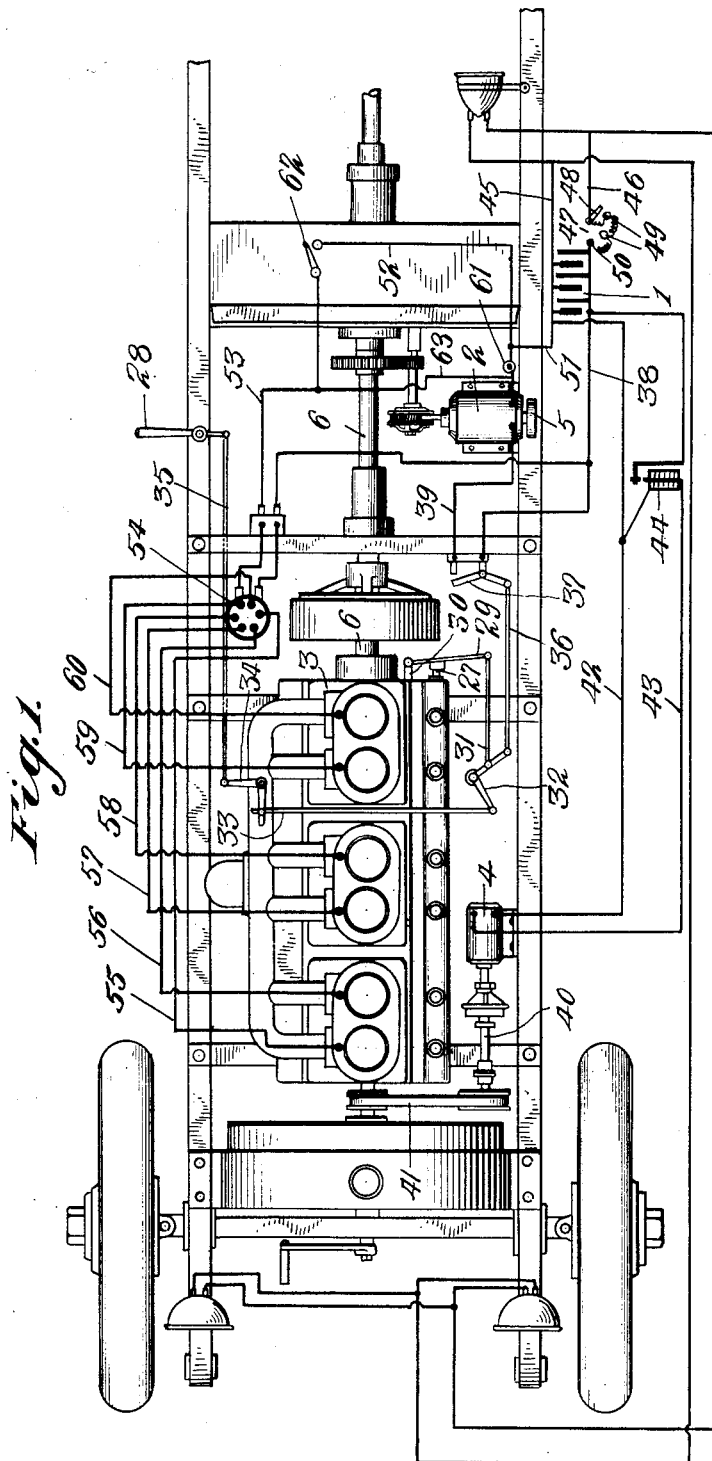
Figure 1 shows the electrical connections and also is a top plan view of so much of an automobile as is necessary for a clear understanding of the invention which is illustrated in connection therewith.

Referring in detail to Fig. 1, in which we have shown our invention applied to and working in conjunction with a six-cylinder engine, the numeral 1 indicates a storage-battery, 2 the starter motor, 3 the engine, and 4 the generator, all of which are shown coöperatively associated but adapted for independent, successive, and simultaneous operation.

*Starting.*—The starting feature of our invention as shown, consists in using a small high speed motor 2, having a high starting torque characteristic on the armature of which may be carried a flywheel or weight 5, in which is stored kinetic energy during the actuation of the motor by the energizing current from the battery 1. The motor and the fly wheel may be extremely small in dimension, considering the amount of work that they accomplish. The motor itself may be approximately four and one-half inches in diameter and seven and one-half inches in length. The flywheel may be about four inches in diameter and weigh approximately two pounds. This equipment, together with the associated gear connections, is capable of turning over a six-cylinder, fifty horse-power engine instantly and at the expense of but approximately 180 watts of energizing current.

We wish it here understood that the motive power of a small high-speed motor having a high starting torque characteristic may be sufficient in some instances to start an engine without the additional power exerted by the flywheel, and in such instances the flywheel need not be used. The employment of a high-speed motor having a high starting torque characteristic has been found to be perfectly feasible and practicable for starting large, heavy engines, inasmuch as the service period of the motor is of short duration, and in practice it has been found to require but a very few seconds to effect the desired result.

Figure 2:
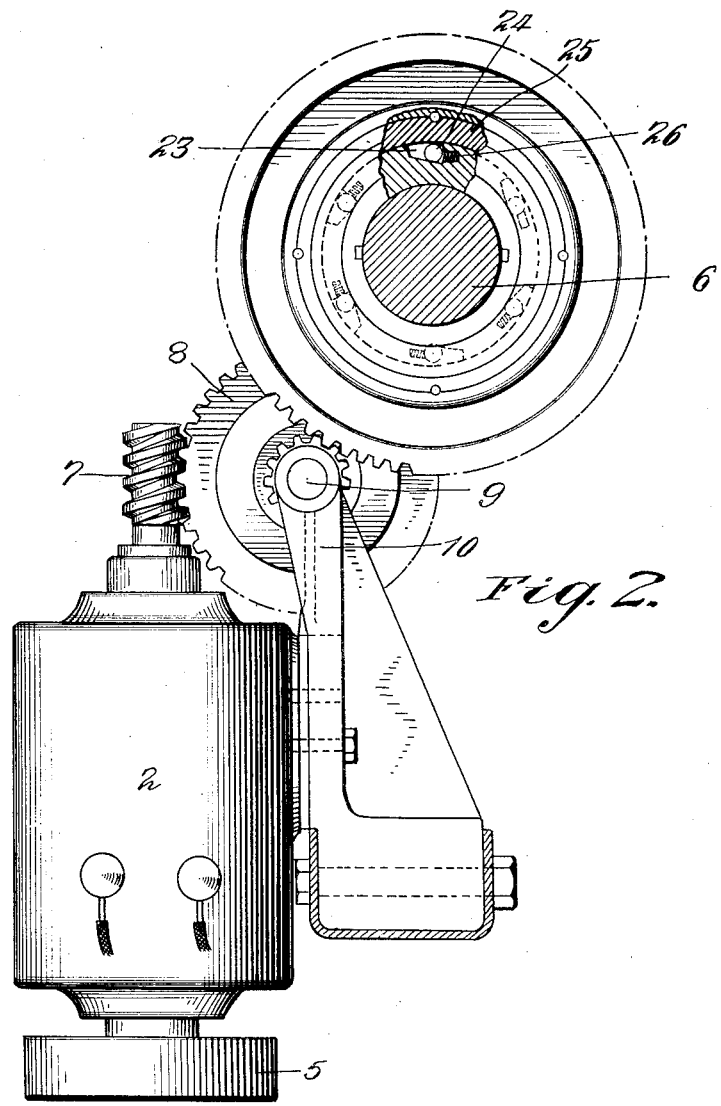
Fig. 2 is an elevation on a larger scale of the starter motor and associated clutches and train of reducing gearing, the transmission shaft being shown in cross-section.

The starter-motor 2, is connected to the crank-shaft 6, by an intermediate train of gears and clutch-members as follows:

Referring now to the details as shown in Figs. 2 and 3, the armature of the motor carries at one end a worm 7, which meshes with a worm-wheel 8, the latter being mounted upon a countershaft 9, and free to rotate independently thereon. The said countershaft is supported in suitable brackets 10. In engagement with the worm-wheel 8 and driven thereby, is a friction-clutch comprising a pair of cup-shaped plates 11 and 12, disposed on opposite sides thereof. The plate 11 is fast on the shaft 9, and the plate 12 is splined thereto. Bearing upon the plate 12 is a spider-spring 13, the tension of which is adjustable by means of the nut 14. 15 and 16 are wear-resisting washers interposed between the plates 11 and 12 and the worm-wheel as shown.

The friction-clutch and worm-wheel as thus described afford an adjustable yielding connection between the starter-motor and the engine and has a two-fold purpose. This clutch regulates and controls the quantity of motive power imparted through the shaft 9 and associated gears to the crank-shaft of the engine for the purpose of actuating the same, and secondly provides a yielding shock-absorbing connection that will take care of any possible back-kick due to premature explosions which might impart a reverse motion to the crank-shaft of the engine as well as to the mechanism connecting the starter-motor thereto. This sudden and abrupt generation of power by the engine exceeds the motive power of the starter-motor and as the frictional adherence of the clutch is properly regulated by the tension of the spring 13 to effect the transmission of sufficient of the motive power to turn over the engine, it is apparent that this driving power is easily overcome by the explosive power of the engine. In practice we have found that a back-kick usually results from the lack of power applied to the engine at the crucial point of compression and that our starting motor, with its flywheel, is sufficiently powerful to prevent any such back-kick from occurring. But should any such occur, the speed and power transmitted to the crank-shaft and the connecting gears by the engine is so great that it overcomes the adhering power of the friction-clutch and causes the clutch to rotate independently of the worm-wheel 8, which is in positive connection with the armature of the motor. Thus it will be seen that the sudden shock due to the back-kick of the engine is absorbed by the friction-clutch, and that the starter-motor as well as the connecting mechanism, is protected from derangement and breakage.

The starter-motor is connected with the crank-shaft of the engine by reduction gearing, the ratio of which is 100 to 1 in the illustrated embodiment of the invention, so that while the motor itself is actuating at the high speed of six thousand to ten thousand revolutions per minute, the main shaft of the engine rotates at but sixty to one hundred revolutions per minute. This comparatively slow crank-shaft movement of the engine has been found to be just as effective in starting an internal combustion engine as a rapid crank-shaft movement.

In our apparatus it will also be noted that by reason of the momentum or energy which is stored in the flywheel of the motor during the greater part of the rotation of the engine shaft, the speed of the shaft is not suddenly reduced as the point of maximum compression is reached, but the engine is carried over the point at substantially undiminished speed and thus loss of compression or failure to fire is largely avoided.

At one end of the countershaft 9 is arranged a pinion 17, in mesh with a gear-wheel 18, which is operably connected to the driving shaft 6 of the explosion engine through an interposed clutch. The purpose and construction of this clutch will now be explained.

The initial working impulse caused by an explosion in the cylinder of the engine will cause the crank-shaft to move at a speed in excess of that imparted by the starter, so that it will be necessary that the crank-shaft be permitted to rotate free of the gear-wheel 18 and the mechanism with which it is in positive connection. The clutch comprises a pair of rings 19, in which are mounted a pair of ball-cups 20, coöperative with a ring 21 for forming suitable ball-races. The gear-wheel 18 is made fast to the ring 21. A ring 22 is provided with a series of pockets 23, which open toward the inner face of the ring 21. The bottoms of these pockets are inclined in a common direction. A roller 24 is mounted in each pocket and is lightly pressed up the incline toward the friction-face 25 of the ring 21, by means of a small spring 26. Upon rotation of the gear-wheel 18 in a counter-clockwise direction under actuation of the starter-motor, the rollers will couple the parts together and the crank-shaft of the engine will rotate in unison with the gear-wheel. Upon the speed of the crank-shaft exceeding the speed of the gear-wheel 18 when the engine becomes self-actuated, the rollers will be forced and dislodged from their coupling position, thus permitting the crank-shaft to rotate independently of the gear-wheel. This construction of the clutch, it will be noted, permits the starter-motor to be in position to regain control of the crank-shaft automatically when a series of misses follows an explosion. As the speed of the crank-shaft becomes reduced to the point where the speed imparted to the gear-wheel by the starter-motor will equal it, it will be carried under the power of the latter. By this means the crank-shaft will not be permitted to halt after its rotation has been inaugurated by the starter-motor.

In order to lighten the load that the starter-motor is required to move in turning over an internal combustion engine, we may provide means for partially relieving the engine compression so that we retain just sufficient pressure in the cylinder under compression to obtain an initial impulse upon an explosion, the force of this explosion acting to reëstablish a full compression condition in the cylinder. Such a means we have illustrated in the form of an exhaust-valve-operating-rod which is conveniently arranged so as to enable one, by a slight movement of an operating lever, to open all of the exhaust valves of the engine to a slight degree. This valve-operating mechanism may be conveniently described as follows:

A slide-rod 27 is arranged to engage the tappets of the various exhaust-valves and raise them when a pull is exerted thereon. This rod 27 is connected to an operating-handle 28, through a lever 29, pivoted at 30, a connecting-rod 31, bell-crank-lever 32, a connecting-rod 33, a bell-crank-lever 34, and a cable 35.

Upon the operation of this mechanism to partially relieve the compression of the engine, we provide means for connecting the motor to the battery so that the motor may be started. The mechanism to accomplish this result consists of a connecting-rod 36, connected at one end to the bell-crank-lever 32, and at the other end to a knife-switch 37, the poles of which are connected, one with the storage-battery through lead or wire 38, and the other with the motor through lead or wire 39. As soon as the initial impulse of the engine is obtained, the force of the explosion, acting against the exhaust-valves, will cause them to close, forcing the slide-rod 27 out of engagement with the exhaust-valve tappets, causing the bell-crank-lever 32 to rock, and this movement, transmitted through the connecting-rod 36, will cause the knife-switch 37 to open or break the battery or energizing circuit of the starter-motor. Thus the starter-motor consumes a minimum amount of electrical energy and only sufficient to accomplish the starting of the engine.

*Generating.*—A generator of the type above described is driven from a counter-shaft 40, which in turn is driven by a belt 41, connected with the main shaft of the engine. The generator is connected with the storage-battery through leads or wires 42 and 43. 44 indicates an automatic cut-out in the generator storage battery circuit and operates to cut the generator out when the speed of the generator falls below the necessary speed for charging the battery, and thus prevents the storage-battery from discharging into and running the generator as a motor.

*Lighting.*—The lighting part of the system consists in arranging the lamps which, in the present instance, are six-volt lamps, in multiple, so that the voltage of the storage-battery described will be sufficient to cause their illumination. The lamp circuits being so clearly illustrated, it is not thought necessary to describe the same in detail other than to say that the leads or wires 45 and 46 connect with the two poles of each lamp. In order to control and modify the illuminating power of the lamps, we interpose a resistance switch or rheostat 47, the switch-arm 48 coöperating with the contacts 49, between which are arranged the resistance-coils 50, which serve to vary the illuminating power according to the manner in which the switch is manipulated. This is important when driving through towns or congested districts where the law or conditions require the lights to be modified.

*Ignition.*—The current for igniting the charges in the cylinders of the engine is also taken from the storage-battery 1, through leads or wires 51, 52, 53, to the distributer 54, from which it is distributed to the respective spark plugs of the engine through leads or wires 55, 56, 57, 58, 59, 60, the return being grounded back to the battery, as is usual. We provide, also, switches 61 and 62. The switch 61, of the push-button type, may control the actuation of the starter-motor, and the switch 62 may control the ignition circuit.

When it is desired to start, the starter circuit may be closed by the push-button 61, which will cause the current to flow from the storage-battery, through the starter motor 2, and also permit the current to divide and go to the distributer through lead or wire 63, and thence to the spark plugs of the engine. When it is desired to use the storage-battery for ignition only, at times when the starter-motor is at rest, the switch 62 is employed for closing the circuit between the storage-battery and the spark-plugs.

It is to be understood that where we have used the word "characteristic" in this specification, we have in mind the technical meaning that is commonly given to it in electrical engineering. Thus, a motor having a high starting torque characteristic is exemplified in a series motor, such a motor inherently having a high starting torque at low speeds; a torque which is enormously greater than the starting torque of a shunt motor of the same horse-power rating.

From the foregoing it will be observed that we have provided a complete unitary electric system for automobiles capable of generating and supplying the needed electric current for all desired purposes connected therewith.

It will furthermore be observed that the motor employed is of such a character as to be capable of creating a high starting torque, which enables it to momentarily deliver sufficient power to start the engine without depleting, or drawing upon, the storage battery energy to such an extent as to impair the current supplied or furnished thereby to the ignition circuit.

Having thus described our invention, what we claim as new herein and desire to secure by Letters Patent is:

1. The combination with a variable speed engine, of an electric starting and generating plant therefor, comprising a storage battery, a generator adapted to give a substantially constant voltage, a starting motor independent of the generator, circuits and switches whereby the generator may be connected to the battery independently of the starting motor, driving connections from the engine shaft to the generator, yieldable driving connections from the motor to the shaft of the engine, and means for disconnecting the engine from the motor when the engine operates under its own power.

2. The combination with a variable speed engine, of an electric starting and generating plant therefor, comprising a generator, a storage battery connected thereto, a motor independent of the generator, circuits and switches whereby the generator may be connected to the battery independently of the motor, driving connections from the engine shaft to the generator, yieldable driving connections from the motor to the shaft of the engine, and means for disconnecting the engine from the motor when the engine operates under its own power.

3. The combination with a variable speed engine, of an electric starting and generating plant therefor, comprising a generator, a storage battery, a starting motor independent of the generator, circuits and switches for connecting the battery to the generator or to the motor independently, means connecting the generator to the engine, relatively low speed gearing and a yieldable drive connecting the motor to the engine, and automatic means for disconnecting the motor from the engine when the latter operates under its own power.

4. The combination with a variable speed engine; of an electric starting and generating plant therefor; comprising a generator; a storage battery connected thereto; a starting motor independent of the generator, circuits and switch connections between the motor, generator and battery; yieldable driving connections from the motor to the shaft of the engine; driving connections between the shaft and generator; and means for disconnecting the engine from the motor when the engine operates under its own power.

5. The combination with a variable speed engine; of an electric starting and generating plant therefor; comprising a generator; a storage battery; a starting motor independent of the generator; circuits and switch connections between the motor, generator and battery; means connecting the generator to the engine for driving the generator; relatively low speed gearing and a yieldable drive connecting the motor to the engine; and automatic means for disconnecting the motor from the engine when the latter operates under its own power.

6. The combination with a variable speed engine; of an electric starting and generating plant therefor; comprising a generator; a storage battery connected thereto; a starting motor independent of the generator; circuits and switch connections between the motor, generator and battery; yieldable driving connections from the motor to the shaft of the engine; means for disconnecting the engine from the motor when the engine operates under its own power; and means constantly connecting the generator to the engine shaft.

7. The combination with a variable speed engine, of an electric starting and generating plant therefor, comprising a generator, a storage battery connected thereto, a starting motor independent of the generator, circuits and switches whereby the generator may be connected to the battery independently of the starting motor, yieldable driving connections from the motor to the shaft of the engine, driving connections between the shaft and generator, and means including an overrunning clutch for disconnecting the engine from the motor when the engine operates under its own power.

8. The combination with a variable speed engine, of an electric starting and generating plant therefor, comprising a storage battery, a generator adapted to give a substantially constant voltage when connected thereto, an automatic cutout to prevent the generator being run as a motor, a starting motor independent of the generator, circuits and switches whereby the generator may be connected to the battery independently of the starting motor, driving connections from the engine shaft to the generator, yieldable driving connections from the motor to the shaft of the engine, and means for disconnecting the engine from the motor when the engine operates under its own power.

9. The combination with a variable speed engine, of an electric starting and generating plant therefor, comprising a generator, a storage battery connected to the generator through an automatic cutout which prevents the generator being run as a motor, a motor independent of the generator, circuits and switches whereby the generator may be connected to the battery independently of the motor, connections from the engine shaft to the generator, yieldable driving connections from the motor to the shaft of the engine, and means for disconnecting the engine from the motor when the engine operates under its own power.

10. The combination with a variable speed engine, of an electric starting and generating plant therefor, comprising a generator, a storage battery, a starting motor independent of the generator, circuits and switches for connecting the battery to the generator or to the motor independently, and including an automatic cutout which prevents the generator being run as a motor, means connecting the generator to the engine, relatively low speed gearing and a yieldable drive connecting the motor to the engine, and automatic means for disconnecting the motor from the engine when the latter operates under its own power.

11. The combination with a variable speed engine; of an electric starting and generating plant therefor; comprising a generator; a storage battery connected thereto; a starting motor independent of the generator; circuits and switch connections between the aforesaid, including an automatic cutout preventing the generator being run as a motor; yieldable driving connections from the motor to the shaft of the engine; driving connections between the shaft and generator; and means for disconnecting the engine from the motor when the engine operates under its own power.

12. The combination with a variable speed engine; of an electric starting and generating plant therefor; comprising a generator; a storage battery; a starting motor independent of the generator; circuits and switch connections between the aforesaid including an automatic cutout to prevent the generator being run as a motor; means connecting the generator to the engine for driving the generator; relatively low speed gearing including a yieldable drive connecting the motor to the engine; and automatic means for disconnecting the motor from the engine when the latter operates under its own power.

13. The combination with a variable speed engine; of an electric starting and generating plant therefor; comprising a generator; a storage battery connected thereto; a starting motor independent of the generator; circuits and switch connections between the aforesaid, including an automatic cutout to prevent the generator being run as a motor; yieldable driving connections from the motor to the shaft of the engine; means for disconnecting the engine from the motor, when the engine operates under its own power; and means constantly connecting the generator to the engine shaft.

14. The combination with a variable speed engine, of an electric starting and generating plant therefor, comprising a storage battery, a generator adapted to give a substantially constant voltage, a starting motor independent of the generator, circuits and switches whereby the generator may be connected to the battery independently of the starting motor, driving connections from the engine shaft to the generator, driving connections from the motor to the shaft of the engine which connections are independent of the shaft-generator connections, and means for disconnecting the engine from the motor when the engine operates under its own power.

15. The combination with a variable speed engine, of an electric starting and generating plant therefor, comprising a generator, a storage battery connected thereto, a motor independent of the generator, circuits and switches whereby the generator may be connected to the battery independently of the motor, driving connections from the engine shaft to the generator, driving connections from the motor to the shaft of the engine which connections are independent of the shaft-generator connections, and means for disconnecting the engine from the motor when the engine operates under its own power.

16. The combination with a variable speed engine, of an electric starting and generating plant therefor, comprising a generator, a storage battery, a starting motor independent of the generator, circuits and switches for connecting the battery to the generator or to the motor independently, means connecting the generator to the engine, an independent relatively low speed gearing connecting the motor to the engine, and automatic means for disconnecting the motor from the engine when the latter operates under its own power.

17. The combination with a variable speed engine, of an electric starting and generating plant therefor, comprising a generator, a storage battery connected thereto, a starting motor independent of the generator, circuits and switches whereby the generator may be connected to the battery independently of the starting motor, driving connections from the motor to the shaft of the engine, driving connections between the shaft and generator which connections are independent of the motor-engine connections, and means including an over-running clutch for disconnecting the engine from the motor when the engine operates under its own power.

18. The combination with a variable speed engine, of an electric starting and generating plant therefor, comprising a storage battery, a generator adapted to give a substantially constant voltage when connected thereto, an automatic cutout to prevent the generator being run as a motor, a starting motor independent of the generator, circuits and switches whereby the generator may be connected to the battery independently of the starting motor, driving connections from the engine shaft to the generator, driving connections from the motor to the shaft of the engine which connections are independent of the shaft-generator connections, and means for disconnecting the engine from the motor when the engine operates under its own power.

19. The combination with a variable speed engine, of an electric starting and generating plant therefor, comprising a generator, a storage battery connected to the generator through an automatic cutout which prevents the generator being run as a motor, a motor independent of the generator, circuits and switches whereby the generator may be connected to the battery independently of the motor, connections from the engine shaft to the generator, driving connections from the motor to the shaft of the engine which connections are independent of the shaft-generator connections, and means for disconnecting the engine from the motor when the engine operates under its own power.

20. The combination with a variable speed engine, of an electric starting and generating plant therefor, comprising a generator, a storage battery, a starting motor independent of the generator, circuits and switches for connecting the battery to the generator or to the motor independently, and including an automatic cutout which prevents the generator being run as a motor, means connecting the generator to the engine, an independent relatively low speed gearing connecting the motor to the engine, and automatic means for disconnecting the motor from the engine when the latter operates under its own power.

21. The combination with a variable speed engine, of an electric starting and generating plant therefor, comprising a generator, a storage battery connected thereto, an automatic cutout preventing the generator being run as a motor, a starting motor independent of the generator, circuits and switches whereby the generator may be connected to the battery independently of the starting motor, driving connections from the motor to the shaft of the engine, driving connections between the engine and generator which connections are independent of the motor-engine connections, and means including an over-running clutch for disconnecting the engine from the motor when the engine operates under its own power.

22. The combination with a variable speed engine, of an electric starting and generating plant therefor, comprising a generator, a storage battery connected thereto, an automatic cutout preventing the generator being run as a motor, a starting motor independent of the generator, circuits and switches whereby the generator may be connected to the battery independently of the starting motor, yieldable driving connections from the motor to the shaft of the engine, driving connections between the engine and generator, and means including an over-running clutch for disconnecting the engine from the motor when the engine operates under its own power.

In witness whereof we have hereunto set our hands in the presence of two subscribing witnesses.

EDWARD VASSALLO HARTFORD.
LOUIS MASTRANGEL.

Witnesses:
CHAS. LYON RUSSELL,
WM. C. DUNN.